United States Patent Office 3,432,200
Patented Mar. 11, 1969

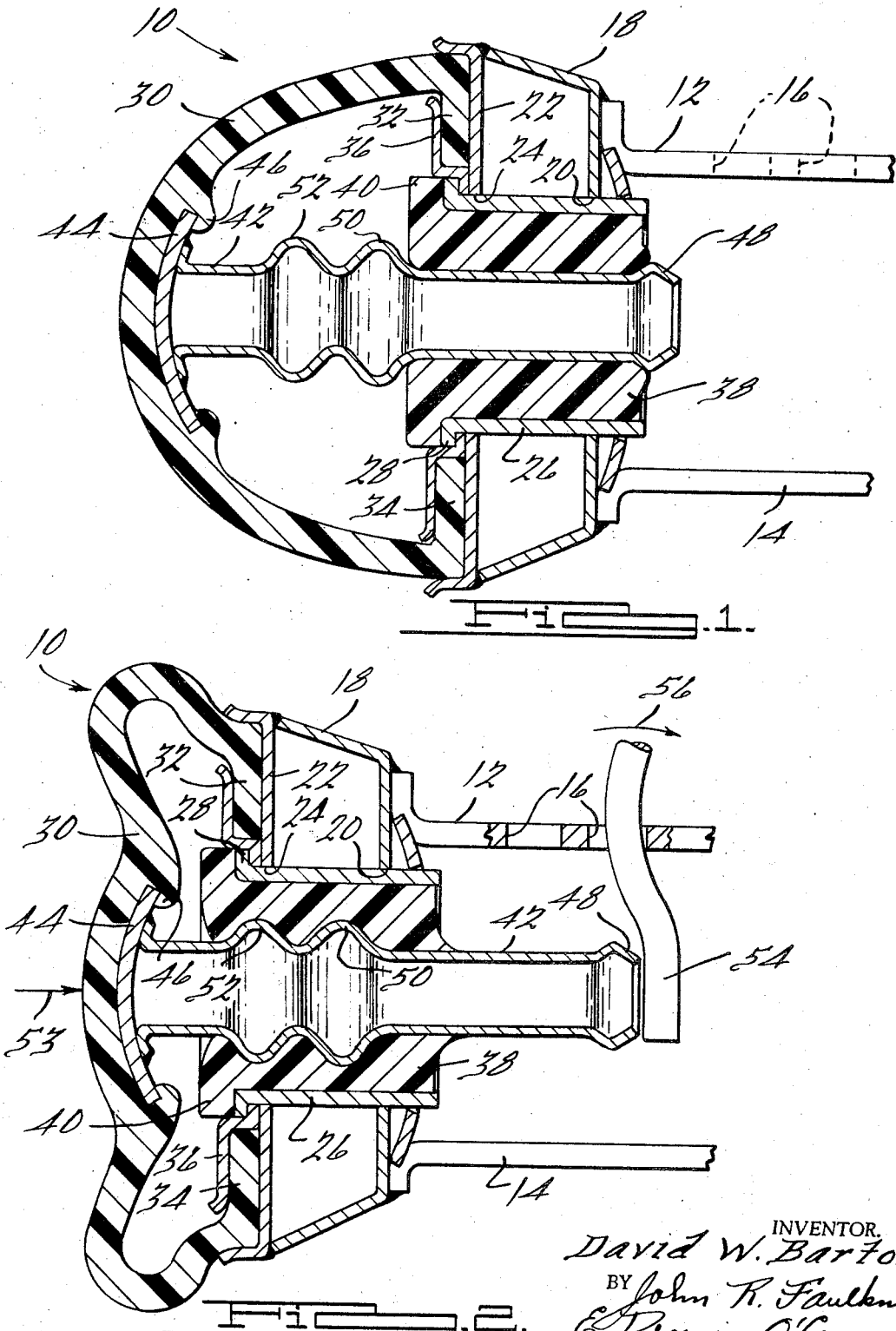
March 11, 1969     D. W. BARTON     3,432,200
ELASTOMERIC IMPACT ENERGY ABSORBING BUMPER
Filed Oct. 16, 1967

3,432,200
ELASTOMERIC IMPACT ENERGY ABSORBING BUMPER
David W. Barton, Birmingham, Mich., assignor to Ford Motor Company, Dearborn, Mich., a corporation of Delaware
Filed Oct. 16, 1967, Ser. No. 675,460
U.S. Cl. 293—71                9 Claims
Int. Cl. B60r *19/00;* B61f *19/04*

ABSTRACT OF THE DISCLOSURE

A motor vehicle impact energy absorbing bumper having an outer shell of flexible material that will deform upon impact. Secured to the inner surface of the outer shell for movement therewith is a shaft slidably and snugly received in a resiliently deformable bushing. The shaft has enlarged portions between the bushing and shell that abut and deform the bushing upon displacement of the shaft due to impact forces applied to the shell.

Background of the invention

The prior art details many motor vehicle bumper designs intended to eliminate or minimize the damage to vehicle bumper assemblies caused by minor collisions as frequently occur when a motor vehicle is driven in close quarters, parked or driven in heavy traffic. The frequency of such collisions in the day-to-day operation of a motor vehicle is well known and the damage resulting therefrom is often costly relative to the seriousness of the impact and bothersome to repair. Such bumper designs often include a bumper having an outer shell of deformable material that will absorb limited amount of impact energy and return to its normal position following an impact. The limited amounts of impact energy that may be dissipated by such a bumper, however, often do not prevent transmission of impact forces through the deformable bumper shell to attendant structure inboard of the bumper. Bumper mounting structure, painted sheet metal and other vehicle elements thus may become damaged during minor impacts, although a resiliently deformable bumper itself may not be harmed.

It is an object of this invention to provide a motor vehicle bumper having an outer shell of flexible material that will be deformed when impacted to minimize the damage thereto, and that may be returned to its original shape following an impact. The bumper of this invention also is capable of absorbing large amounts of impact energy to prevent impact forces from being transmitted through the flexible bumper to surrounding motor vehicle parts. The bumper of this invention is reusable following an impact, simple to manufacture and reliable in function.

Summary of the invention

An impact energy absorbing bumper constructed in accordance with this invention is adapted for use on a motor vehicle having sheet metal body panel supporting structure. The bumper includes rigid support means operably secured to the supporting structure and a flexible outer bumper shell secured to the support means. A resiliently deformable bushing, carried by the support means, inboard of the outer shell and spaced therefrom, comprises the principal energy dissipating element of the invention. This bushing has an aperture extending therethrough and facing the bumper outer shell. A shaft is slidably received in the bushing and has one of its ends bearing on the inner surface of the outer shell. The shaft has an enlarged portion located between the bushing and the outer shell. The cross sectional area of the enlarged shaft portion is greater than the cross sectional area of the bushing aperture. Upon the outer shell being displaced toward the bushing by an impact force, the enlarged shaft portion will be displaced into the bushing aperture and the bushing aperture deformed to receive the enlarged shaft portion.

Description of the drawing

FIGURE 1 is a cross sectional elevation view of an energy absorbing motor vehicle bumper constructed in accordance with this invention, prior to said bumper being impacted during a motor vehicle collision; and FIGURE 2 is a view similar to FIGURE 1, but illustrating the bumper of this invention following an impact being applied thereto.

Detailed description of the invention

Referring now in detail to the drawing, the numeral 10 indicates generally an energy absorbing bumper constructed in accordance with this invention. Bumper 10 is secured to bumper mounting brackets 12 and 14 that may be integrally formed with the body sheet metal supporting element of the motor vehicle or operatively attached to said elements. A plurality of apertures 16 extend through upper bumper bracket 12.

A C-shaped inner mounting member 18 is secured to brackets 12 and 14 and has secured to the arms thereof a C-shaped outer support member 22. Apertures 20 and 24 are formed through mounting members 18 and 22, respectively, and these apertures register with one another. A sleeve 26, having a flange 28 extending radially from the outer portion thereof, is secured within apertures 20 and 24.

An outer bumper shell 30, formed from flexible material such as urethane, has formed thereon flanges 34 and 36 that bear against the outer surface of outer support member 22. Shell 30 is retained in this orientation by a retaining member 36 that interlocks with flange 28 of sleeve 26.

A resiliently deformable bushing 38, formed from energy absorbing material such as urethane or rubber is mounted within the sleeve 26. A shoulder 40 is formed on the outer extremity of bushing 38 and bears against flange 28 of sleeve 26, thereby preventing inward movement of the bushing relative to the sleeve. A shaft 42 extends through the central aperture of bushing 38 and has secured to the outer end thereof a shaft head 44. The contour of the outer surface of shaft head 44 is such that it intimately engages the inner arcuate surface of bumper shell 30. Shaft head 44 merely may bear against hte inner surface of shell 30 or shell 30 may be molded, as at 46, to secure shaft head 44 thereto.

The end of shaft 42 remote from shaft head 44 has formed thereon an enlargement 48 that prevents outwardly directed movement of shaft 42 due to the vibrations and movements of normal vehicle operation. A pair of radially extending enlargements 50 and 52 are formed along the length of shaft 42 between bushing 38 and shaft head 42. As may be observed from the drawing, the cross sectional area defined by the outer periphery of these enlargements is greater than the cross sectional area of the aperture extending through bearing 38.

The operation of the device described above may be appreciated with reference to FIGURE 2 of the drawing. Upon an impact force being applied to outer bumper shell 30, such a force being represented by the arrow 53, shell 30 will be deformed as illustrated in FIGURE 2. Force 53 will be transmitted to shaft head 44 causing an inwardly directed movement of shaft 52. Such movement of shaft 42 will cause projection 50 to abut the end wall of bearing 38 causing a deformation of said bearing to accommodate projection 50 within the central aperture of the bearing. If impact force 53 is of a sufficient magnitude, enlargement 52 also will cause a displacement of bearing 38 as it enters the central aperture. In order to increase the resistance given by bearing 38 against inwardly directed movement of shaft 42, enlargement 52 may have a slightly greater cross sectional area than enlargement 50.

As readily may be appreciated, energy is required to cause the displacement of bearing 38 necessary for the accommodation of enlargements 50 and 52 within said bearing. The forces required to cause this deformation of bearing 38 correspond to a portion of the impact energy dissipated. Impact energy also is dissipated due to the force required to deform flexible outer shell 30.

Following an impact of bumper 10, the bumper may be returned to its original position of further use by inserting a pry bar 54 through one of the holes 16 extending through bracket 12. Pry bar 54 may thus be brought into contact with the inward end of shaft 42 and pivoted in the direction represented by the arrow 56 to return shaft 42 to the position illustrated in FIGURE 1. A tire iron or other convenient elements conveniently may be used as a pry bar 54.

It thus may be seen that this invention provides an energy absorbing bumper for a motor vehicle that not only minimizes damage to said bumper due to minor vehicle collisions but also is capable of absorbing large amounts of impact energy to prevent damage to bumper surrounding structures due to impact forces. The energy absorbing bumper of this invention is convenient to manufacture and easily may be fabricated on vehicles already in use. The bumper is reusable indefinitely following instances of impact forces being applied thereto.

It is to be understood that this invention is not limited to the exact construction illustrated and described above or the abstract preceding this specification, but that various changes and modifications may be made without departing from the spirit of the invention as defined by the following claims.

I claim:
1. A reusable impact energy absorbing bumper for a motor vehicle having sheet metal body panels supporting structure, said bumper including a rigid support assembly and having an aperture extending therethrough operatively secured to said structure, flexible impact receiving means located outboard of and secured to said assembly, a movable member extending through said aperture and having one end thereof bearing against said impact receiving means for inboard movement therewith, resiliently deformable means secured to said assembly in said aperture and surrounding said movable member, and shoulder means formed on said movable member and located between said resiliently deformable means and said one end in a pre-impact condition, whereby upon said impact receiving means being impacted said movable member is driven inwardly and said shoulder means deforms and is surrounded by said resiliently deformable means.

2. The bumper of claim 1, wherein said movable member comprises a shaft.

3. The bumper of claim 2, wherein said resiliently deformable means comprises a bushing having an aperture extending therethrough, said shoulder means comprising a plurality of radially extending projections on said shaft, the cross sectional area defined by the periphery of said projections being greater than the cross sectional area of the bushing aperture.

4. The bumper of claim 3, wherein said shaft extends through and makes a snug fit with said bushing, said shaft having an enlarged portion proximate the other end thereof.

5. An impact energy absorbing bumper for a motor vehicle having sheet metal body panel supporting structure, said bumper including rigid support means operatively secured to said structure, a flexible outer bumper shell secured to said support means, a resiliently deformable bushing carried by said support means inboard of said outer shell and spaced therefrom, an aperture extending through said bushing facing said outer shell, and a shaft slidably received in said bushing aperture, one end of said shaft operatively bearing on said outer shell, said shaft having an enlarged portion located between said bushing and said outer shell, the cross sectional area defined by the periphery of said enlarged shaft portion being greater than the cross sectional area of said bushing aperture, so that upon said outer shell being displaced towards said bushing by an impact force said enlarged shaft portion will be displaced into said bushing aperture with said bushing being deformed to receive said enlarged shaft portion.

6. The bumper of claim 5, wherein said shaft extends through said bushing, the end of said shaft remote from said outer shell comprising a second enlarged shaft portion.

7. The bumper of claim 5, wherein said one shaft end has a shaft head mounted thereon, said shaft head having a contour mating with the contour of the inner surface of said outer shell.

8. The bumper of claim 5, wherein said bushing is formed from urethane.

9. The bumper of claim 5, wherein said enlarged shaft portion includes a plurality of radially extending projections integrally formed on said shaft.

References Cited
UNITED STATES PATENTS

| | | | |
|---|---|---|---|
| 2,788,998 | 4/1957 | Wilfert | 293—62 |
| 3,056,620 | 10/1962 | Adams et al. | 293—71 |

ARTHUR L. LA POINT, *Primary Examiner.*

H. BELTRAN, *Assistant Examiner.*

U.S. Cl. X.R.
293—63, 88, 89, 99